(12) United States Patent
Rendina et al.

(10) Patent No.: US 6,454,161 B1
(45) Date of Patent: *Sep. 24, 2002

(54) OPENING DEVICE ON A PACKAGING SHEET MATERIAL

(75) Inventors: Antonio Rendina, Carpi (IT); Magne Karlsson, Lund; Tord Breivald, Staffanstorp, both of (SE)

(73) Assignee: Tetra Laval Holdings & Finance SA, Pully (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/269,506

(22) PCT Filed: Sep. 23, 1997

(86) PCT No.: PCT/SE97/01595

§ 371 (c)(1),
(2), (4) Date: Mar. 29, 1999

(87) PCT Pub. No.: WO98/18684

PCT Pub. Date: May 7, 1998

(30) Foreign Application Priority Data

Oct. 31, 1996 (IT) .......................................... MI96A2274

(51) Int. Cl.[7] ........................... B65D 43/00; B65D 5/70; B65D 41/32

(52) U.S. Cl. ........................... 229/125.15; 229/125.09; 220/266; 220/270; 220/276; 220/255.1; 220/257.2; 220/269

(58) Field of Search ................................. 220/258, 276, 220/270, 266, 269, 339, 359; 229/125.15, 125.64, 123.3, 125.04, 125.14, 125.17, 125.42; 222/541, 563

(56) References Cited

U.S. PATENT DOCUMENTS

| 3,883,034 A | 5/1975 | Raushing |
| 3,900,155 A | 8/1975 | Rausing et al. |

(List continued on next page.)

FOREIGN PATENT DOCUMENTS

| WO | WO 95/07844 | 3/1995 |
| WO | WO 97/09238 | 3/1997 |

*Primary Examiner*—Lee Young
*Assistant Examiner*—Tri M. Mai
(74) *Attorney, Agent, or Firm*—Burns, Doane, Swecker & Mathis, L.L.P.

(57) ABSTRACT

An opening device (2) attached at a hole (4) in a top wall portion (16) of a packaging container (12) and positioned adjacent a fold line (14) of the packaging container, including a base portion (8) connected to the top wall at the hole, and a lid portion (10) releasably connected to the base portion, in which the base portion has a portion (26) protruding from a main circumferential portion (24) towards the fold line (14), for providing increased stability of the container during storage and transport. A tamper evidence protrusion (11), also functioning as a pull tab for opening the lid portion, extends from the lid portion to be connected to an outer side (6b) of the top wall portion. A reduced thickness tearing edge (28) is provided between the base portion and the lid portion for facilitating opening, and a bistable hinge (9) releasably biases the lid portion to stably remain in an open position, for avoiding interference of the lid portion during product dispensing. The base portion has an upper ring portion (30) and the lid portion has a lower ring portion (32) which after the release of the lid portion from the base portion may be mutually intermated in a releasably locked manner, so as to reseal the opening device.

5 Claims, 3 Drawing Sheets

U.S. PATENT DOCUMENTS

| | | |
|---|---|---|
| 3,977,591 A | 8/1976 | Mårtensson |
| 3,998,354 A | 12/1976 | Song |
| 4,197,949 A | 4/1980 | Carlsson |
| 4,223,789 A | 9/1980 | Reil |
| 4,258,876 A | 3/1981 | Ljungcrantz |
| 4,715,528 A | 12/1987 | Kjeigaard et al. |
| 4,725,213 A | 2/1988 | Reil et al. |
| 4,819,839 A | 4/1989 | Carlsson et al. |
| 4,895,298 A | 1/1990 | Reil |
| 4,909,434 A * | 3/1990 | Jones et al. ............ 229/125.15 |
| 4,913,294 A | 4/1990 | Giacomelli |
| 4,944,408 A | 7/1990 | Rausing |
| 4,986,465 A | 1/1991 | Jacobsson et al. |
| 5,020,686 A * | 6/1991 | Dutt ......................... 220/258 |
| 5,067,614 A | 11/1991 | Jönsson |
| 5,108,029 A * | 4/1992 | Abrams et al. ......... 229/125.09 |
| 5,176,300 A * | 1/1993 | Kishikawa et al. ......... 222/541 |
| 5,199,618 A | 4/1993 | Reil et al. |
| 5,199,635 A * | 4/1993 | Abrams et al. ............. 229/125.09 |
| 5,271,519 A * | 12/1993 | Adams et al. ............... 220/258 |
| 5,348,183 A * | 9/1994 | Luch et al. .................. 220/256 |
| 5,364,019 A | 11/1994 | Björck et al. |
| 5,397,013 A * | 3/1995 | Adams et al. ...... 229/125.15 X |
| 5,597,082 A * | 1/1997 | Luch et al. .................. 220/276 |
| 5,620,550 A | 4/1997 | Andersson et al. |
| 5,632,440 A | 5/1997 | Tragardh et al. |
| 5,758,793 A * | 6/1998 | Forsyth et al. ............... 220/270 |

\* cited by examiner

OPENING DEVICE ON A PACKAGING SHEET MATERIAL

TECHNICAL FIELD

The present invention relates to an opening device provided at a hole in a packaging sheet material. In particular, the invention relates to a synthetic plastics material opening device which has been directly injected moulded on the sheet.

BACKGROUND ART

Opening devices of different types provided on a packaging container formed by packaging sheet material and adapted for containing substances such as foodstuffs, and in particular for containing liquid beverages such as juices, water, milk, wine, etc. are known.

Examples of such opening device include a hole on a wall part of the packaging container and a plastics material lid device attached to the wall part and covering the hole in a closed state. The lid device includes a circumferential base attached to the wall part, for example by means of adhesives, circumferentially surrounding the hole, and a lid element hinged to the base. The hole may be a perforation, and once the lid element is opened, the perforation may be engaged and forced open so that the contents inside the packaging container may be dispensed therefrom. Alternatively the hole may be a circumferential hole punched in the sheet. A sealing element such as an aluminium pull tab is connected to the wall part so as to cover the opening, and once the lid element has been opened, the sealing element may be removed to expose the opening for dispensing the contents of the packaging container.

Opening devices which include a perforated hole on the sheet present the disadvantage that when the perforation is broken by the user, material portions from the perforation may become dislodged from the sheet and mix with the contents inside the container. In the case of opening devices which include a hole punched in the sheet, the provision of the sealing element connected to the sheet for closing the hole adds additional requirements for apparatus and method steps for forming the opening device on the sheet, thereby reducing the overall efficiency of the formation of the opening device on the sheet. Both these types of opening devices also have the disadvantage that a separate lid device must be attached to the sheet, in which the lid device is formed in a separate method and apparatus thereby adding costs related to a separate manufacturing line and to separate storage and transport of the lid devices so as to even further reduce the efficiency of the opening device formation on the lid.

Moreover, both these types of opening devices are subject to the problem of edge soaking, in which the edge of the perforation or hole in the sheet comes into contact with the contents of the package thereby to compromise the stability of the sheet and package. Generally, the packaging sheet material is formed of several layers including an inner paper layer and two outer synthetic plastics material coating layers, one of which is destined to form a product contact surface. Other possible layers such as printing ink layers, laminating layers and aluminium foil layers may be interposed between the paper layer and the outer coating layers. The hole or perforation in the sheet will expose the internal layers of the sheet at such hole or perforation, and unless such edge is adequately sealed the packaged product may come into contact with the internal layers of the packaging sheet material possibly causing damage to the product and/or the package. In the case of the opening devices provided with a circumferential hole, extra steps have been taken to provide a patch for sealing the hole edge, which however even further reduces the efficiency in the opening device manufacture.

A further problem encountered in the above-described opening devices, due to the fact that the base is positioned circumferentially distant from the hole or perforation, is that after a certain amount of product is poured out of the container, residual product often remains inside the lid device, in contact with the outer surface of the sheet between the hole or perforation and the base of the lid device. Precise placement of the base on the sheet so that it is flush with the hole is unfeasible, and the consequence of residual product left in contact with the outer surface of the container is fastidious to the user. Moreover, in these known opening devices, while the lid device may be reclosable, once the perforation or hole has been opened, the package is not resealable in the sense that the hole or perforation is not itself reclosed or resealed.

As an alternative to the above opening devices, in which an already formed plastics material lid device is applied to the sheet, U.S. Pat. No. 4,725,213 discloses a plastics material opening device which is injection moulded directly onto the sheet of packaging material. In particular, a pair of mould tools are moved into arrangement about a prestamped hole in the sheet, and heated thermoplastics material is injected through an injection passage defined between one of the mould tools and one surface of the sheet and extending along such surface of the sheet in order to form the opening device at the prestamped hole. The mould tools are shaped so that the formed opening device includes a pair of circumferential flange portions each of which is attached to the opposite surfaces of the sheet at the edge of the prestamped hole, thereby attaching the opening device to the sheet.

The mould tools consist of a pair of mould tools which are both movable in opening and closing directions which extend perpendicularly to the extension of the sheet. Such a moulding configuration in U.S. Pat. No. 4,725,213 substantially limits the flexibility of the device in forming opening devices which different shapes, since the mould tools in their release movement must not encounter any portions of the opening device which protrude in a direction perpendicular to the direction of movement of the mould tools.

The opening device in U.S. Pat. No. 4,725,213 moreover includes a lid which is torn off at weakened lines without any provision for reclosing or resealing of the package after the lid is removed.

Another problem encountered with conventional opening devices attached to packaging material sheets is that the opened lid portion frequently is positioned to hinder the dispensing operation of the contents of the package.

Another problem which exists with opening devices attached to sheet holes consists in that the provision of the hole in the sheet frequently weakens the mechanical strength of the sheet. Packages made of these sheets with opening devices attached at the sheet holes are generally stored and shipped in stacks, and the weakening of the sheet at the holes may lead to collapse and damage of the container during shipping and storing. A possible solution for compensating for the sheet hole weakness would be to provide opening devices having parts extending for large areas about the sheet hole. However, such provisions would lead to increased manufacturing costs due to increase in material requirements and production difficulties and inefficiency in forming and attaching the larger parts to the sheet. In the case of direct injection moulding of the opening device, for example, increased times would be required for injecting into larger mould cavities, leading to a significant decrease of efficiency of the production line.

It is seen that there exists a need in the field of packaging sheet material opening devices to provide opening devices having an improved functionality. Moreover, it is desirous that opening devices provided at holes in sheets are of such a nature so as to be manufacturable in the most effective and efficient manner possible.

DISCLOSURE OF THE INVENTION

In accordance with one preferred aspect of the invention, there is provided an opening device attached at a hole in a top wall portion of a packaging container and positioned adjacent a fold line of the packaging container, in which a base portion of the opening device includes a main circumferential portion circumferentially enclosing the extension of the hole and a protruding portion which protrudes from the main circumferential portion towards the fold line. The extension of the protruding portion towards the fold line of the container allows to strengthen the packaging material sheet by distributing forces to the fold line, such that containers provided with the opening device may be stacked for storage and transport without collapse. Moreover, the protruding portion constitutes a small portion of the base portion with respect to the main circumferential portion, so as to maintain efficiency of manufacture of the opening device by requiring minimised material amounts and simplified procedures.

The opening device according to another preferred aspect of the invention includes a tamper evidence protrusion which extends from a lid portion of the opening device to be connected to an outer side of the sheet. A user is therefore assured that the container has not been tampered with when the tamper evidence protrusion is stably connected to the outer side of the sheet. Such tamper evidence protrusion further functions as a pull tab for opening the lid portion.

In accordance with still another aspect of the invention, a reduced thickness tearing edge is provided between the base portion and the lid portion. In a preferred embodiment, first and second end portions of the tearing edge are thinner still that two connecting lateral portions of the tearing edge, so that the initial and final tearing actions of the lid are extremely easy thereby to reduce undesirable abrupt movements to the container at the initial and final tearing actions and to make the entire removal procedure of the lid portion essentially smooth and uniform.

The opening device according to a further aspect of the invention, there are provided lower and upper ring portions respectively of a lid portion and a base portion of the opening device which are mutually connected by a tearing edge. Once the lid portion has been removed from its connection with the base portion, the upper and lower ring portions may be mutually intermated in a releasably locked manner, so as to reseal the opening device. In a most preferred embodiment, one of the ring portions is releasably lodged inside the other ring portion in a snap-type arrangement.

The opening device according to another preferred aspect of the invention includes a bistable hinge connecting the lid portion to the base portion, such that in the open position of the lid portion with respect to the base portion, the bistable hinge releasably biases the lid portion to stably remain in its open position.

The technical characteristics and advantages of the present invention will become apparent to those skilled in the art from the following detailed description of some preferred embodiments thereof, described and illustrated in the accompanying drawings only by way of non-limitative example, wherein like reference numerals indicate like parts.

BEST MODE(S) FOR CARRYING OUT THE INVENTION

Figure 1:
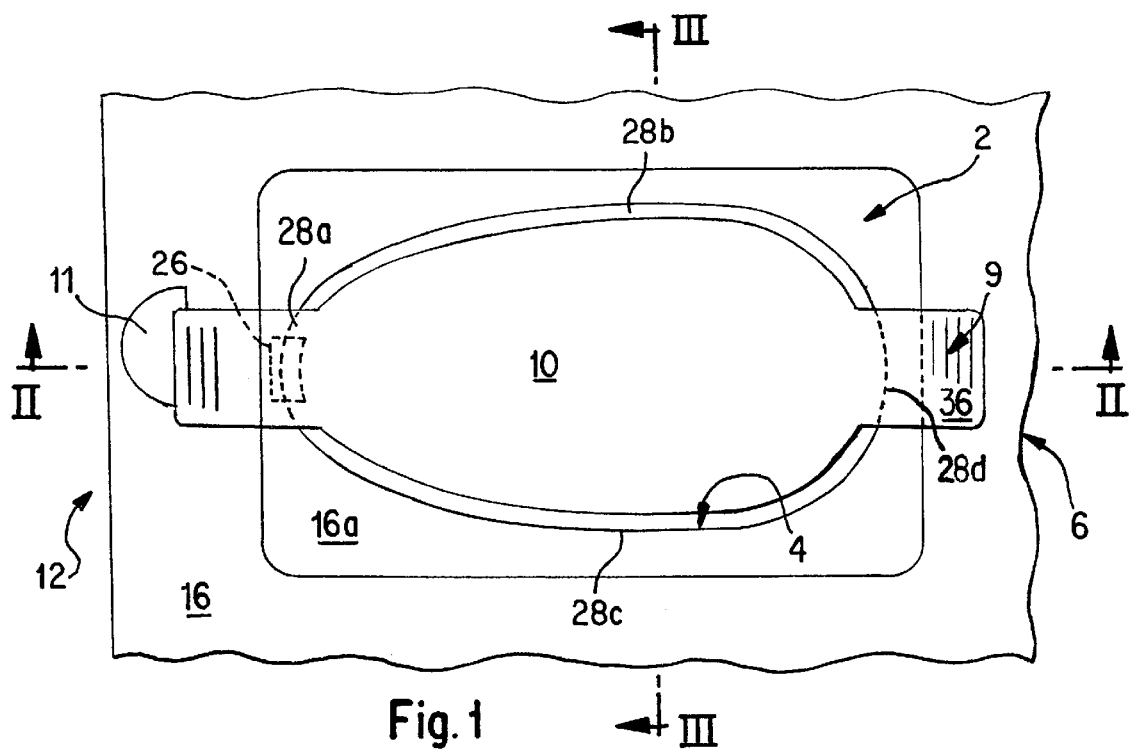
FIG. 1 is a top plan view of an opening device attached to a packaging sheet material according to one preferred embodiment of the invention.
Figure 2:
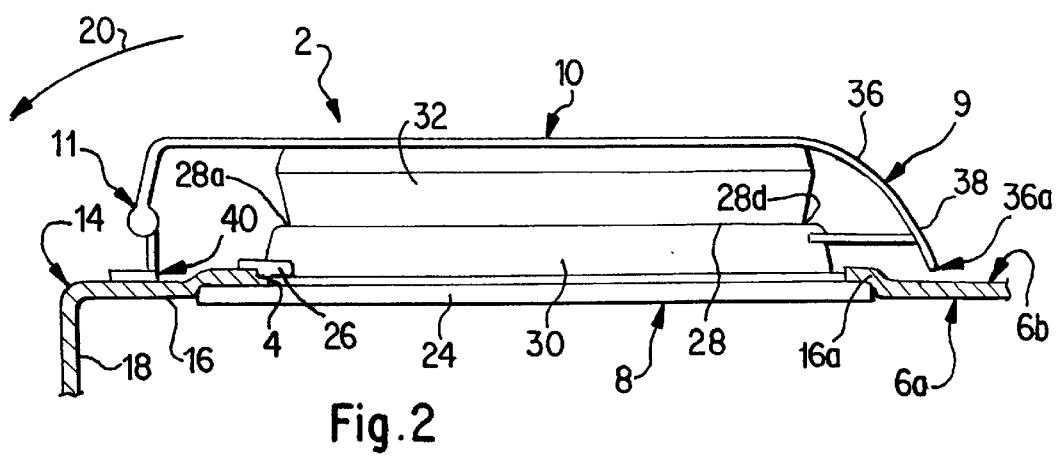
FIG. 2 is a side elevation view of the configuration of FIG. 1 in which the sheet is shown in cross-section taken in the plane II—II of FIG. 1.
Figure 3:
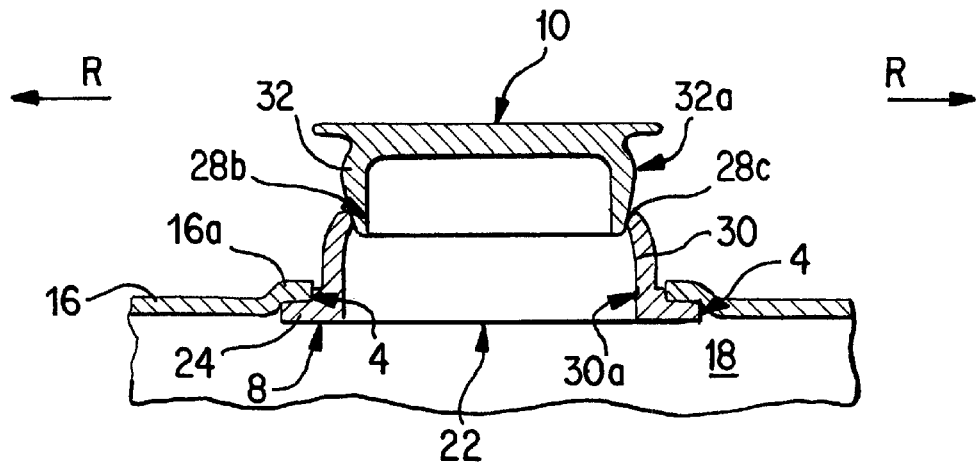
FIG. 3 is a cross-sectional rear elevation view of the opening device of the previous FIGS. 1–2a taken in the plane III—III of FIG. 1.

With initial reference to FIGS. 1–3, there is shown an opening device 2 attached at a hole 4 provided in a packaging material sheet 6. Opening device 2 includes a base portion 8 connected to sheet 6 at hole 4 and a lid portion 10 releasably connected to base portion 8. Lid portion 10 is connected to base portion by means of a hinge element 9, and a tamper evidence protrusion 11, functioning also as a pull tab for releasing lid portion 10 from base portion, extends from lid portion 10 and connects to the outer side 6b of sheet 6.

In the embodiment shown, packaging material sheet 6 is folded at a plurality of fold lines and sealed in a known manner to form a packaging container 12 for containing products, in particular alimentary products. In the preferred embodiment sheet 6 is a synthetic plastics coated paper carrier material, and packaging container 12 is folded to have a shape of a brick. Apparatus and methods for folding and sealing sheets for forming packaging containers, and for filling the packaging containers with product are known. One example of a machine for forming, filling, and sealing packaging containers is the TB8 filling machine manufactured by Tetra Brik Packaging Systems of Modena, Italy.

FIGS. 1–3 show a portion of packaging container 12, in which sheet 6 is folded at a fold line 14 to form a top wall portion 16 and a side wall portion 18 of container 12. Hole 4 and opening device 2 are arranged at top wall portion 16, adjacent fold line 14, for facilitating pouring of product out of container 12 by tilting container 12 over side wall portion 18 in direction 20 (FIG. 2). When lid portion 10 is removed from base portion 8, product may be dispensed from container 12 through an opening 22 of base portion 8 arranged in correspondence with hole 4 in sheet 2.

Base portion 8 includes a main circumferential portion, in the form of an inner flange portion 24 arranged in contact with the inner side 6a of sheet 6, which is larger than the extension of hole 4 so as to circumferentially enclose the extension of hole 4. In accordance with one preferred aspect of the invention, base portion 8 further includes a protruding portion which protrudes from main circumferential portion 24 towards fold line 14. The protruding portion in the embodiment shown is in the form of an outer flange projection 26 arranged in contact with the outer side 6b of sheet 6.

The extension of protruding portion 26 towards fold line 14 of container 12 allows to strengthen packaging material sheet 6 by distributing forces to fold line 14, so as to prevent damage of sheet 6 from occurring around hole 4 during stacking and transportation of containers 12 provided with opening device 2. Moreover, protruding portion 26 constitutes a relatively small portion of base portion 8 with respect to main circumferential portion 24, so as to maintain efficiency of manufacture of opening device 2 by requiring minimised material amounts and less time consuming procedures.

Opening device 2 is preferably formed of synthetic plastics material directly injection moulded on sheet 6, in a manner such that base portion 8 extends in a longitudinal plane which is substantially parallel to the plane of extension of sheet top wall portion 16. Opening device 2 may be formed by inner and outer mould tools arrangeable in moulding position respectively in contact with the sheet inner side 6a and the sheet outer side 6b so as to form a mould cavity in which hole 4 is arranged, and subsequently in which heated thermoplastics material is injected. The outer mould tool may include a pair of half mould tools, which at least in the release movement from the moulding position after opening device has been injection moulded include a directional component of movement parallel to the extension of sheet 6, as indicated by arrows R in FIG. 3, thereby to allow to form portions of opening device such as hinge 9 and tamper evidence protrusion 11.

Connection of various parts of opening device 2, such as tamper evidence protrusion 11 and base portion 8, to sheet 6 is facilitated when opening device 2 is directly injection moulded and sheet 6 is a synthetic plastics coated paper carrier material, since the injected heated thermoplastics material effectively fuses with the plastics coated layer of sheet 6. Opening device 2 may be formed by a mould tool configuration which is such as to provide a slightly raised or embossed portion 16a of sheet top wall portion 16 in correspondence with main circumferential portion 24 of base portion 8.

Opening device 2 may be directly injection moulded on sheet 6 in a continuous production line including a reel of a web of packaging sheet material, a drive for unwinding the web from the reel and feeding the unwound web through the production line, a hole punching station for punching holes in the unwound web, a moulding station for directly injection moulding opening devices 2 at holes punched in the web, and a folding, filling, sealing and cutting station for forming packaging containers 12 filled with product and incorporating opening devices 2. Opening device 2 may be directly injection moulded on packaging sheet material 6 of any type and shape. For example, sheet 6 may be a continuous web of packaging material, or a blank of packaging material, or a protruding flap of packaging material, to mention only a few. Methods and apparatus for performing the above described manufacturing operations are disclosed in the patent application concurrently filed by the same applicant of this application entitled "Apparatus and Method for Moulding An Opening Device on a Packaging Sheet", the disclosure of which is incorporated herein by reference.

When opening device 2 is injection moulded on sheet 6, protruding portion 26 is formed in a portion of the mould cavity which is relatively small and accordingly the time required for properly filling the mould cavity is minimised in order to maximise the efficiency of the formation of opening device 2.

In accordance with another advantageous aspect of the invention, in an initial unopened state of opening device 2, lid portion 10 is connected to base portion 8 at a circumferential tearing edge 28 which has a reduced thickness with respect to the thickness of the adjacently arranged portions of base portion 8 and lid portion 10. In a preferred embodiment, base portion 8 has an upper ring-shaped portion 30 and lid portion 10 has a lower ring-shaped portion 32, and tearing edge 28 is provided between lower ring portion 32 and upper ring portion 30. In one most preferred embodiment, tearing edge 28 includes a first end portion (28a) arranged adjacent tamper evidence protrusion 11 for an initial tearing of tearing edge 28 and an initial release of lid portion 10 from base portion 8, two lateral portions 28b and 28c for successive tearing of tearing edge 28 to progressively release lid portion 10 from base portion 8, and a second end portion 28d arranged adjacent hinge element 9 for a final tearing of tearing edge 28 and a final release of lid portion 10 from base portion 8. At least one and preferably both of first and second end portions 28a and 28d have a thickness which is less than the thickness of lateral portions 28b and 28c, so as to advantageously provide initial and final tearing actions of lid portion 10 which are extremely easy thereby to reduce undesirable abrupt movements to packaging container 12 at the initial and final tearing actions and to make the entire removal procedure of lid portion 10 essentially smooth and uniform.

Circumferential tearing edge 28, upper ring portion 30 of base portion 8, and lower ring portion 32 of lid portion 10 may be provided by injection moulding in which the moulding tools are appropriate configured to form these elements. Similar considerations apply to protruding portion 26 connected to upper ring portion 30, to hinge element 9 interconnected between upper ring portion 30 and lid portion 10, and to tamper evidence protrusion 11 interconnected between lid portion 10 and sheet top wall portion 16.

Reduced thickness tearing edge 28 provides an effective means for a smooth and non-abrupt release of lid portion 10 from base portion 8. Moreover, tearing edge 28 constitutes the only element in opening device 2 which need be provided and which need by released by a user for providing an opening mechanism in opening device 2, thereby increasing simplicity in use for the user and increasing efficiency in forming opening device 2. Base portion 8 also fully seals edge of hole 4 thereby to eliminate edge soaking phenomenon, and upper ring portion 30 of base portion 8 is configured to extend from the inside of packaging container 12 so that products may be dispensed directly through upper ring portion 30 so as to eliminate the phenomenon of residual products remaining about the hole in the packaging material sheet as occurs in known devices.

Figure 3A:
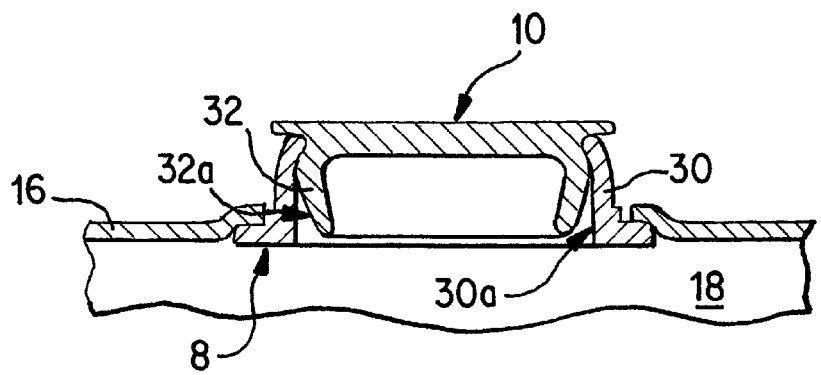
FIG. 3a is a view similar to that of FIG. 3 however with a lid portion of the opening device lodged in base portion of the opening device in a resealed condition.
Figure 3B:
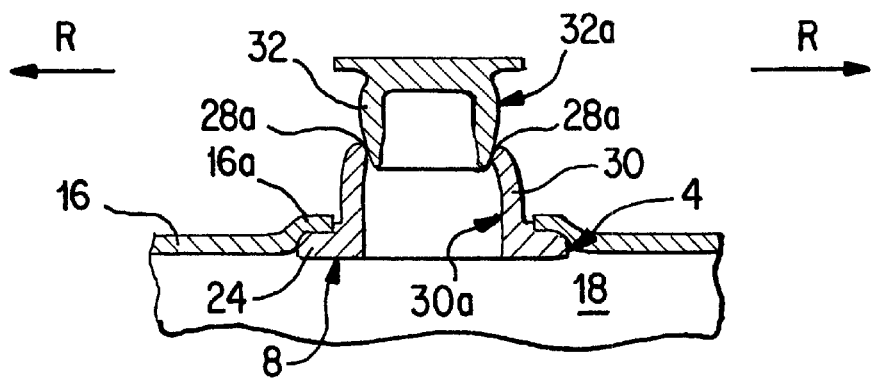
FIG. 3b is a cross-sectional view of a front end of the opening device shown in FIG. 1.

In accordance with another preferred aspect of the invention, upper ring portion 30 and lower ring portion 32 are reclosable after lid portion 10 has been released from base portion 8 such that upper and lower ring portions 30 and 32 have mutually mating surfaces which releasably lock upper ring portion 30 with said lower ring portion 32. In the illustrated embodiment, FIG. 3a shows the releasably locked position in which lower ring portion 32 is releasably lodged inside upper ring portion 30 such that the outer surface 32a of lower ring portion 32 mates with the inner surface 30a of upper ring portion 30. During the initial insertion of lower ring portion 32 into upper ring portion 30, the broken circumferential tearing edge 28 itself provides a small amount of resistance which requires a small amount of elastic deformation of one or both of upper and lower ring portions 30 and 32 so that lower ring portion 32 may be inserted into upper ring portion 30.

As seen in FIG. 3, outer surface 32a of lower ring portion 32 tapers towards a maximum circumferential extension which is larger that the circumferential extension of tearing edge 28. This particular configuration creates a further resistance as lower ring portion 32 is further inserted into upper ring portion 30 which requires a further amount of elastic deformation of one or both of upper and lower ring portions 30 and 32 so that lower ring portion 32 may be fully inserted into upper ring portion 30, with a type of snap-together action. Inner surface 30a of upper ring portion 30 tapers towards tearing edge 28 so as to have a substantially matching configuration with tapered outer surface 32a of lower ring portion 32. The release of upper ring portion 30 from its lodgement inside lower ring portion 32 requires an elastic deformation of one or both of upper and lower ring portions 30 and 32, in a manner such that the particular configuration of upper and lower ring portions 30 and 32 advantageously provides not only a reclosing function but also a resealing function for opening device 2. It is envisaged that the configuration of upper and lower ring portions 30 and 32 may be reversed such that the upper ring portion is lodged in a snap-type arrangement within lower ring portion for achieving these same advantageous affects.

Figure 2A:
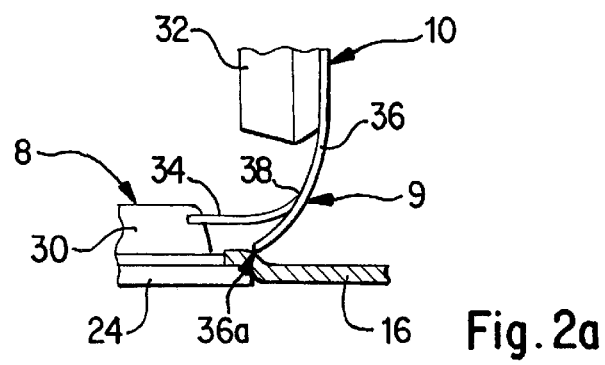
FIG. 2a is a detail side elevation view of a bistable hinge of the opening device of FIGS. 1 and 2 shown in an open position.

Lid portion 10 advantageously remains connected to base portion 8 even in the released position by means of hinge element 9. According to another advantageous aspect of the invention, hinge element 9 is a bistable hinge connecting lid portion 10 with base portion 8 such that in a first stable position lid portion 10 extends in a position adjacent base portion 8, and such that in a second stable position lid portion 10 is rotated to be substantially completely open with respect to base portion 8 in which bistable hinge element 9 releasably biases lid portion 10 to remain in the second stable position (FIG. 2a).

According to a preferred embodiment, bistable hinge 9 includes a first tab 34 connected to and extending from base portion 8, and a second flexible tab 36 connected to and extending from lid portion 10. First and second tabs 34 and 36 are mutually connected at a connecting portion 38, and second tab 36 extends past connecting portion 38 with respect to lid portion 10 for a sufficient extension such that when lid portion 10 is in the second stable position the end 36a of second tab 36 engages with sheet top wall portion 16 and first tab 34 biases second tab 36 to remain engaged with sheet top wall portion 16. Therefore the particular configuration of bistable hinge 9 is such that from the second stable position as seen in FIG. 2a, first tab 34 is essentially in its unflexed normal condition, and in order to pivot lid portion 10 back toward base portion 8, end 36a of second tab 36 would slide against sheet top wall portion 16 and the protruding portion of second tab 36 extending past connecting portion would cause first tab 34 to move upwardly out of its non-flexed state. First tab 34 therefore biases second tab 36 to remain in the second stable position of FIG. 2a, and the biasing action provided by first tab 34 needs to be overcome for repositioning lid portion 10 into its first position.

Bistable hinge 9 therefore advantageously provides an effective means for maintaining lid element 10 in its open position so that it does not cause a hindrance to dispensing product from packaging container 12 provided with opening device 2. Bistable hinge 9 is also advantageously of a simple and cost-effective construction.

Opening device 2 according to another preferred aspect of the invention includes tamper evidence protrusion 11 which extends from lid portion 10 to be connected to outer sheet side 6b. A user is therefore assured that container 12 has not been tampered with when tamper evidence protrusion 11 is stably connected to outer sheet side 6b. Tamper evidence protrusion 11 further functions as a pull tab for opening the lid portion. As seen in FIG. 2, tamper evidence protrusion 11 is connected to outer sheet side 6b at a point 40 which is distal from where base portion 8 is connected to sheet top wall portion 16, so as to advantageously form a type of gap which allows tamper evidence protrusion 11 to be effectively gripped by a user.

Figure 4:
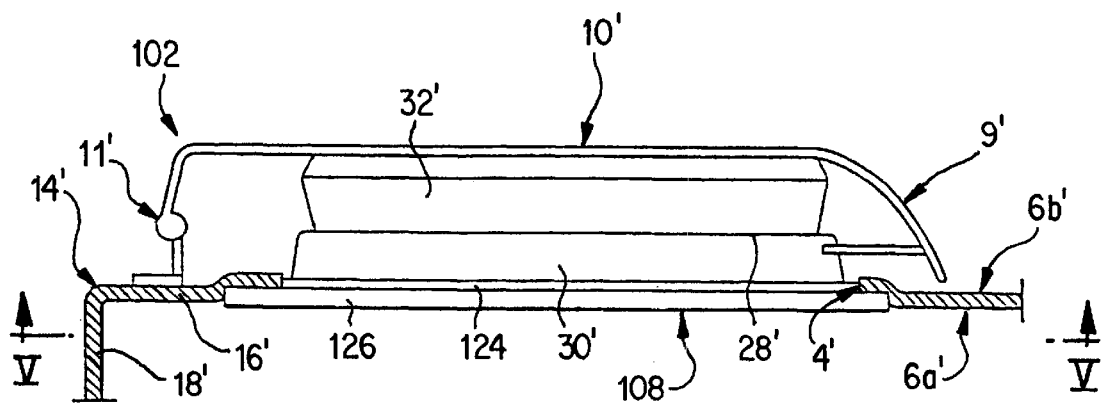
FIG. 4 is a side elevation view similar to that of FIG. 2 showing an opening device according to a second preferred embodiment of the invention.
Figure 5:
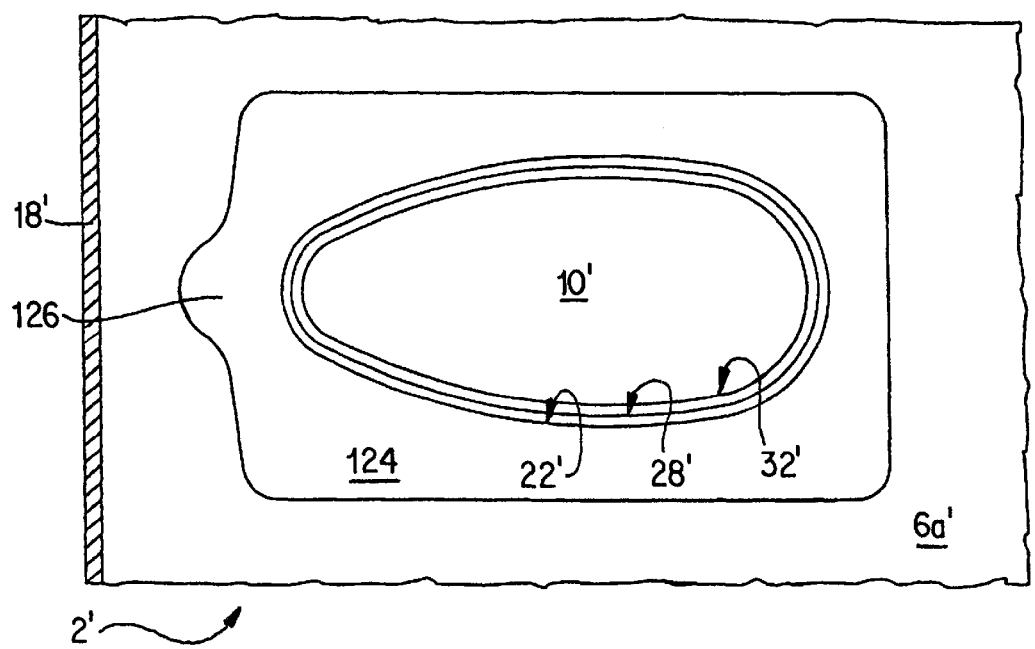
FIG. 5 is a bottom plan view of the opening device of FIG. 4 seen from the plane V—V.

FIGS. 4–5 show an opening device 102 according to another embodiment of the invention, wherein reference numerals with the addition of asterisks indicate parts completely identical to parts referenced by the same numerals in FIGS. 1–3. In a variation to previous opening device 2, opening device 102 includes a base portion 108 with an upper ring portion 30', however outer flange projection 26 is not provided on base portion 108. Base portion 108 still includes a main circumferential portion in the form of an inner flange portion 124, however the protruding portion which protrudes from main circumferential portion 124 towards fold line 14' is instead in the form of an inner projection 126 extending from inner flange portion 124 and arranged in contact with sheet inner side 6a'.

The extension of protruding inner flange portion 124 towards fold line 14' of container 12' also allows to strengthen packaging material sheet 6' by distributing forces to fold line 12', similarly to outer flange projection 26 of FIGS. 1–3, so as to prevent damage of sheet 6' from occurring around hole 4' during stacking and transportation of containers 12' provided with opening device 102. Moreover, protruding portion 126 constitutes a relatively small portion of base portion 108 with respect to main circumferential portion 124, so as to maintain efficiency of manufacture of opening device 102 by requiring minimised material amounts and less time consuming procedures. It is furthermore possible to provide both inner flange portion 124 and outer flange projection 26 on the same opening device, so as to simultaneously achieve the advantageous affects of sheet strengthening and efficiency in manufacture.

While the embodiments of the invention illustrated in the drawing Figures include opening devices 2 and 102 attached to a packaging sheet material adjacent a fold line of the packaging sheet material, it is possible to attach an opening device in accordance with the present invention to various types of packaging sheet materials and at locations thereof which are not necessarily adjacent an fold line, while still achieving similar functionality and similar advantageous results according to various aspects of the disclosed invention. For example an opening device according to the invention may be attached to a packaging material which forms a rounded pouch container without distinct fold lines, and many of the advantageous affects of the invention will still be achieved. Moreover, other shapes of the packaging container, in addition to that of a brick shape, are possible to obtain which incorporate the present opening device. By way of example, the side wall portion of the packaging container may be cylindrical in form, and the angle of bending at the fold edge may be different that the square angle as illustrated in the drawings.

In particular, an opening device according to the invention including one or more, and in any combination, of the disclosed features of the bistable hinge, of the tamper evidence protrusion, of the circumferential tear edge, of the reclosable and resealable configuration of the base and lid portions, and of the general configuration of the base and lid portions, to name just a few of the disclosed features, may be attached to any hole provided in any type of packaging material so as to still achieve the advantageous affects of the invention disclosed herein.

What is claimed is:

1. A packaging container comprising:

a packaging sheet material having a sheet top wall portion and at least one hole formed in said sheet top wall portion, wherein said at least one hole has a predetermined extension and said sheet top wall portion defines a top wall plane; and an opening device directly injection molded into said at least one hole in said sheet top wall portion;

wherein said opening device comprises:

a base portion connected to said sheet top wall portion of said packaging sheet material and extending in a longitudinal plane which is substantially parallel to said top wall plane;

an upper ring portion defined by said base portion releasably connecting a lid portion to the base portion;

a lower ring portion defined by said lid portion;

a main circumferential portion defined by said base portion, said main circumferential portion being larger than the extension of said hole and circumferentially enclosing the extension of said hole;

a circumferential tearing edge provided between said lower ring portion and said upper ring portion and connecting said lid portion to said base portion, said tearing edge defining a circumferential extension and having a reduced thickness with respect to a thickness of said lower ring portion of said base portion and said upper ring portion of said lid portion;

mutually mating surfaces defined by said lower ring portion and said upper ring portion for releasably locking said lower ring portion and said upper ring portion together after said lid portion has been released from said base portion by tearing said circumferential tearing edge, said mutually mating surfaces comprising a surface portion of one of said lower ring portion and said upper ring portion having a circumferential ring extension larger than said circumferential extension of said tearing edge;

wherein said circumferential tearing edge comprises:

a first end portion for an initial tearing of said tearing edge and an initial release of said lid portion from said base portion;

two lateral portions for successive tearing of said tearing edge and a successive release of said lid portion from said base portion; and a second end portion for final tearing of said tearing edge and a final release of said lid portion from said base portion;

wherein at least one of said first and second end portions has a thickness which is less than a thickness of said lateral portions.

2. The container of claim 1 wherein said main circumferential portion comprises an inner flange portion arranged in contact with an inner side of said packaging sheet material.

3. The container of claim 2 wherein said base portion further comprises a protruding portion, said protruding portion comprising an outer flange projection arranged in contact with an outer side of said packaging sheet material.

4. The container of claim 2 wherein said base portion further comprises a protruding portion, said protruding portion comprising an inner projection extending from said inner flange portion and also arranged in contact with the inner side of the packaging sheet material.

5. The container of claim 1 wherein said opening device is a synthetic plastics material opening device.

* * * * *